US008403542B2

(12) United States Patent
Chu

(10) Patent No.: US 8,403,542 B2
(45) Date of Patent: Mar. 26, 2013

(54) LED LAMP WITH IMPROVED HEAT SINK

(76) Inventor: Wei-chih Chu, Ciaotou Township, Kaohsiung County (TW)

( * ) Notice: Subject to any disclaimer, the term of this patent is extended or adjusted under 35 U.S.C. 154(b) by 274 days.

(21) Appl. No.: 13/004,871

(22) Filed: Jan. 11, 2011

(65) Prior Publication Data

US 2012/0176032 A1 Jul. 12, 2012

(51) Int. Cl.

| | |
|---|---|
| ***B60Q 1/06*** | (2006.01) |
| ***F21V 29/00*** | (2006.01) |
| *H01J 1/02* | (2006.01) |
| *H01J 7/24* | (2006.01) |
| *H01J 61/52* | (2006.01) |
| *H01K 1/58* | (2006.01) |

(52) U.S. Cl. ........................... 362/373; 313/46; 362/294

(58) Field of Classification Search ........................ None
See application file for complete search history.

(56) References Cited

U.S. PATENT DOCUMENTS

2009/0225554 A1* 9/2009 Chang et al. .................. 362/373
2010/0259935 A1* 10/2010 Scordino et al. .............. 362/294

* cited by examiner

*Primary Examiner* — Douglas W Owens
*Assistant Examiner* — Dedei K Hammond

(57) ABSTRACT

An LED lamp includes a rectifier; an inverted cup shaped heat sink comprising spaced heat radiating members projecting upward, and spaced hollow cylindrical heat radiating elements arranged around the heat radiating members; a mounting plate fastened between the rectifier and the heat radiating members; L-shaped heat conduction members each having a longitudinal part inserted through the heat radiating element and a lateral part engaged with bottom of the heat sink; and a circuit board secured to the bottom of the heat sink to fasten the lateral parts of the heat conduction members, the circuit board comprising LEDs each electrically connected to the rectifier and being in contact with the lateral parts of the heat conduction members. The heat sink further includes first, second, and third heat radiating plates arranged around the heat radiating element.

10 Claims, 13 Drawing Sheets

LED LAMP WITH IMPROVED HEAT SINK

BACKGROUND OF THE INVENTION

1. Field of Invention

The invention relates to LEDs (light-emitting diodes) and more particularly to an LED lamp with improved heat sink.

2. Description of Related Art

LEDs are renowned for their ability to resist shock. Further, LEDs have many advantages including lower energy consumption, longer lifetime, improved robustness, smaller size, faster switching, greater durability, and greater reliability. LEDs are powerful enough for room lighting. LEDs are used in applications including street lights, automotive lighting, and traffic signals.

LEDs also require more precise current and heat management than compact fluorescent lamp sources of comparable output. Thus, how to effectively, efficiently dissipate heat generated by LEDS is an important issue to be addressed in LED lamp or bulb design.

One typical method is forming heat radiating fins on a heat sink of an LED lamp. However, its heat dissipation performance is low. Thus, the need for improvement still exists.

SUMMARY OF THE INVENTION

It is therefore one object of the invention to provide an LED lamp comprising a rectifier for converting AC into; an inverted cup shaped heat sink comprising a plurality of spaced, elongated heat radiating members projecting upward from top, and a plurality of spaced hollow cylindrical heat radiating elements arranged around the heat radiating members; a mounting plate fastened between the rectifier and the heat radiating members; a plurality of L-shaped heat conduction members each having a longitudinal part inserted through the heat radiating element and a lateral part engaged with bottom of the heat sink, the number of the heat conduction members being less than that of the heat radiating elements; and a circuit board secured to the bottom of the heat sink to fasten the lateral parts of the heat conduction members, the circuit board comprising a plurality of LEDs each electrically connected to the rectifier and being in contact with the lateral parts of the heat conduction members, wherein the heat sink further comprises a plurality of first heat radiating plates each having one end put on the longitudinal part of the heat conduction member, a plurality of second heat radiating plates each having one end fastened in the heat radiating element, and a plurality of third heat radiating plates releasably secured to the heat sink; wherein the first, second, and third heat radiating plates are arranged around the heat radiating element; and wherein each of the first, second, and third heat radiating plates comprises a plurality of openings and shaped top and bottom edges.

The above and other objects, features and advantages of the invention will become apparent from the following detailed description taken with the accompanying drawings.

DETAILED DESCRIPTION OF THE INVENTION

Figure 1:
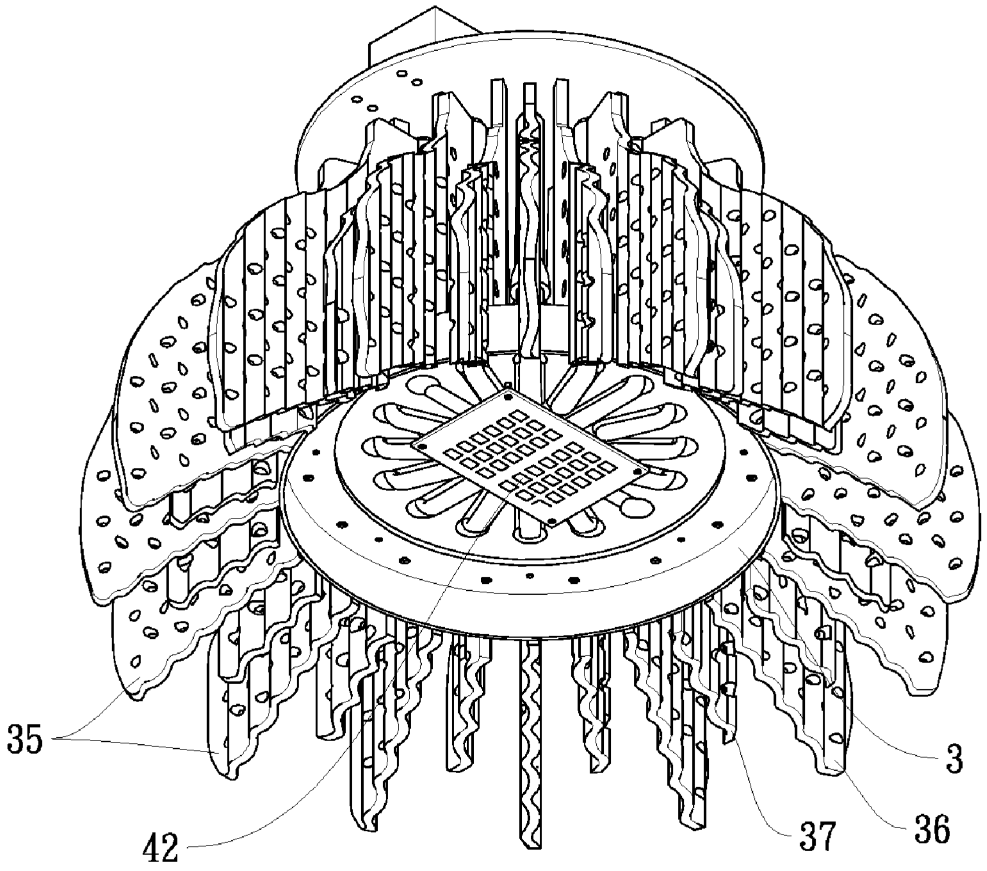
FIG. 1 is a perspective view of an LED lamp according to a first preferred embodiment of the invention.
Figure 2:
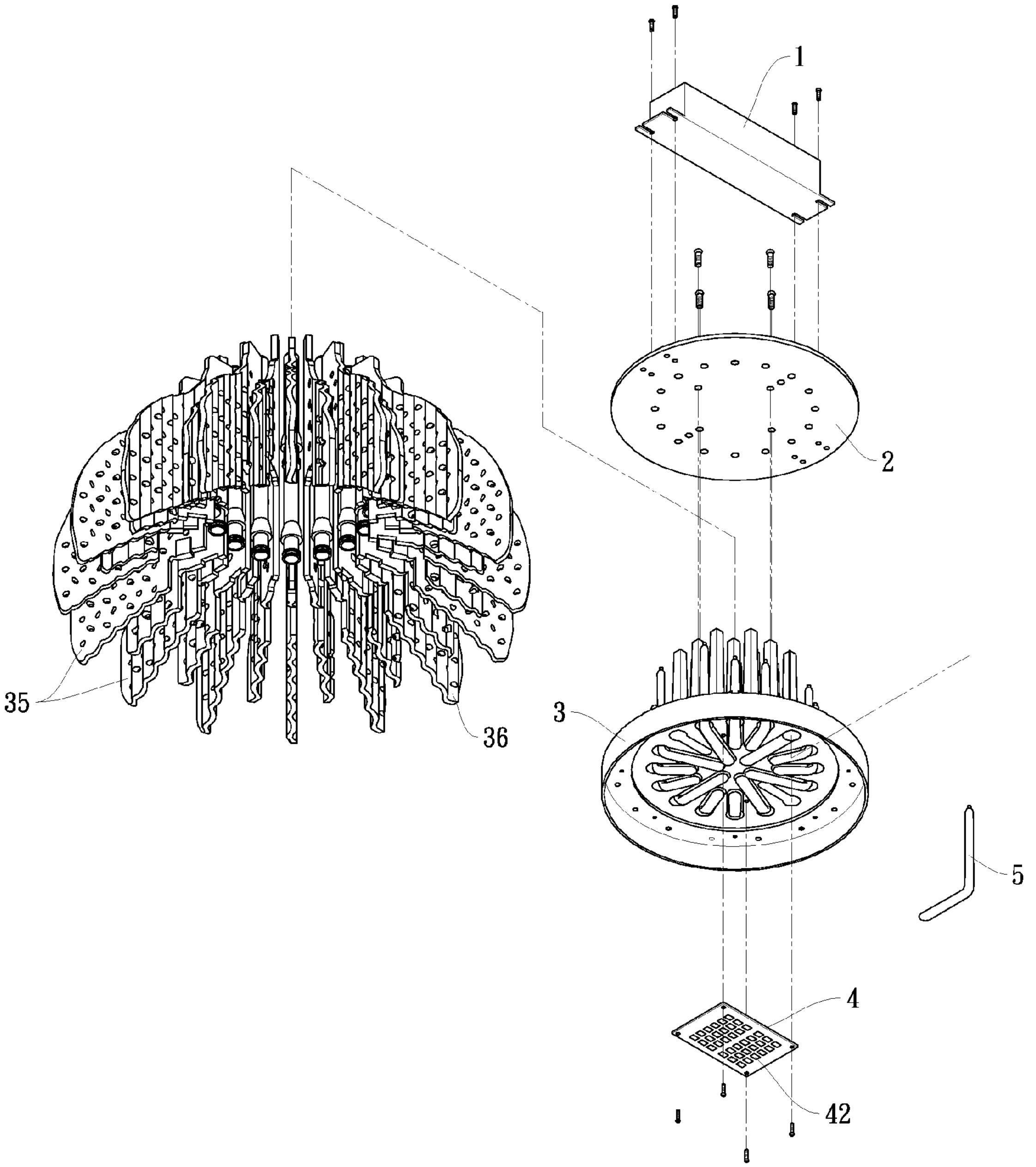
FIG. 2 is an exploded view of the LED lamp.
Figure 3:
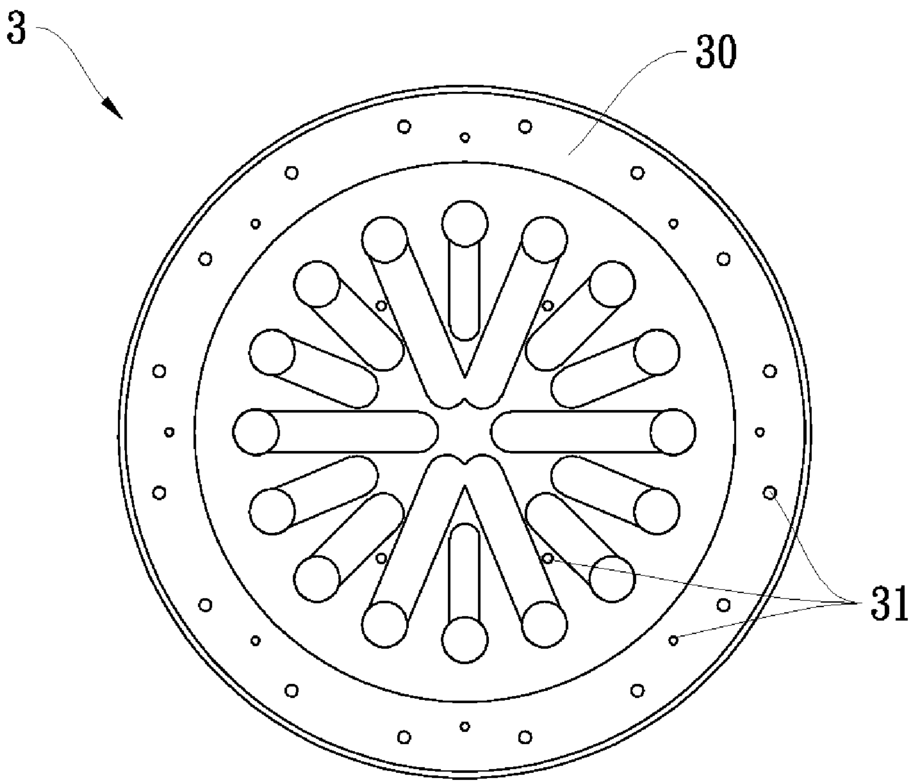
FIG. 3 is a bottom plan view of the heat sink.
Figure 4:
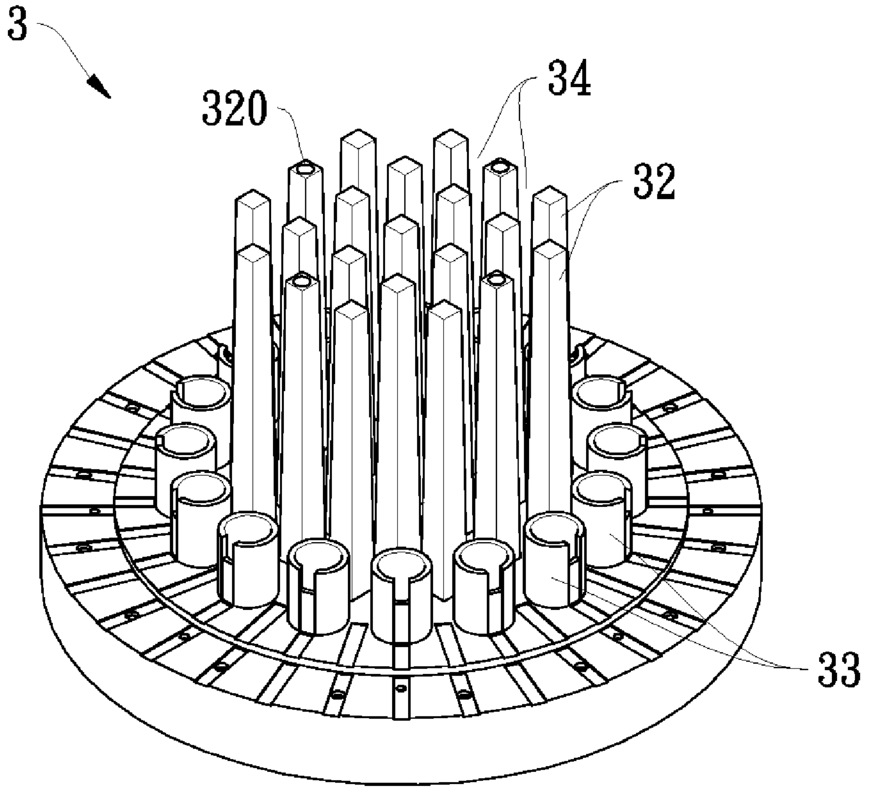
FIG. 4 is a perspective view of the main part of the heat sink.
Figure 5:
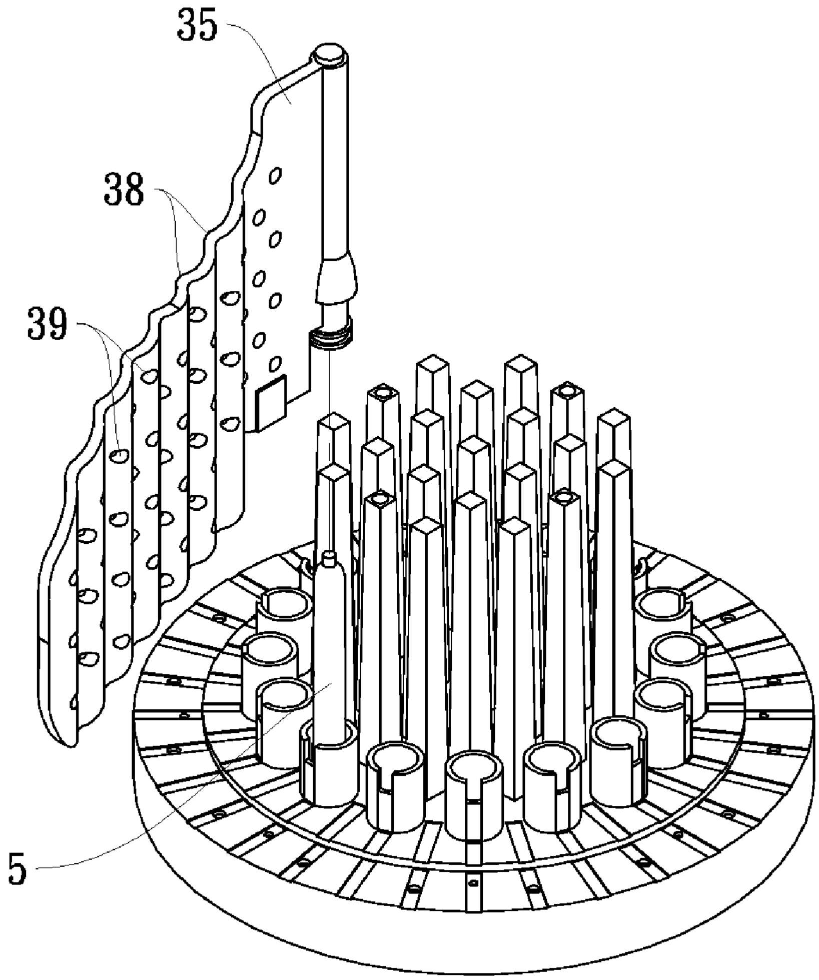
FIG. 5 is a perspective view of the main part of heat sink to be assembled with a first heat radiating plate.
Figure 6:
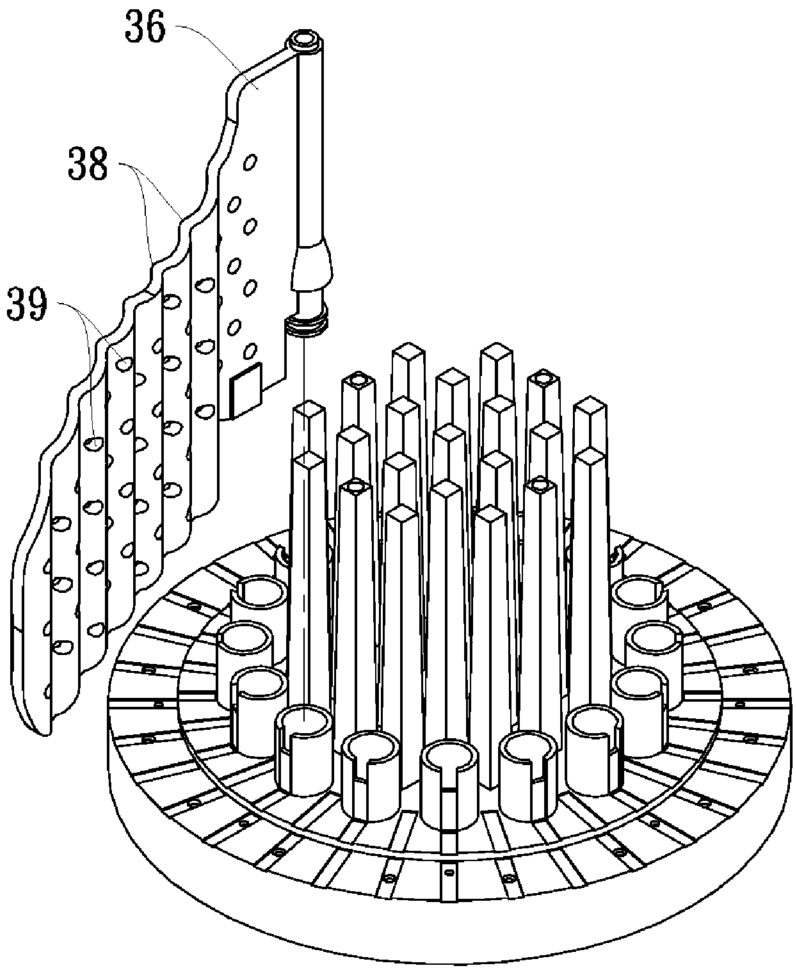
FIG. 6 is a perspective view of the main part of heat sink to be assembled with a second heat radiating plate.

Referring to FIGS. 1 to 11, an LED lamp in accordance with a first preferred embodiment of the invention comprises the following components as discussed in detail below.

A parallelepiped rectifier (e.g., full wave rectifier) 1 is adapted to convert input AC (alternating current) into DC (direct current) and comprises two slits 10 at either end. A disc shaped mounting plate 2 comprises a plurality of threaded holes 20 such that a plurality of fasteners (e.g., four screws) 11 may be driven through the slits 10 into the threaded holes 20 for fastening the rectifier 1 and the mounting plate 2 together. A heat sink 3 is inverted cup shaped and comprises a space 30 open to the bottom, a plurality of longitudinal threaded holes 31, and a plurality of elongated, parallelepiped heat radiating members 32 projecting upward from the top central portion, each of some heat radiating member 32 (four are shown) having a threaded hole 320 such that a plurality of fasteners (e.g., four screws) 321 can be driven through the threaded holes 20 into the threaded holes 320 for fastening the mounting plate 2 and the heat sink 3 together.

The heat sink 3 further comprises a plurality of channels 34 for ventilation purpose, each channel 34 defined among three adjacent heat radiating members 32 or four adjacent heat radiating members 32, and a plurality of spaced hollow cylindrical heat radiating elements 33 arranged around the heat radiating members 32. A plurality of L-shaped heat conduction members 5 each has the longitudinal part inserted through the heat radiating element 33 and the lateral part fitted in a concave portion on the bottom of the heat sink 3 (i.e., top of the space 30). The number of the heat conduction members 5 is less than that of the heat radiating elements 33. A rectangular circuit board 4 comprises four through holes 41 on four corners respectively, a plurality of LEDs 42 arranged in rows, each LED 42 being electrically connected to the rectifier 1, and a plurality of fasteners (e.g., four screws) 40 adapted to drive through the through holes 41 into the threaded holes 31 for fastening the circuit board 4 and the heat sink 3 together. Also, the heat conduction members 5 are fastened. Moreover, the LEDs 42 are in contact with the lateral parts of the heat conduction members 5.

Figure 7:
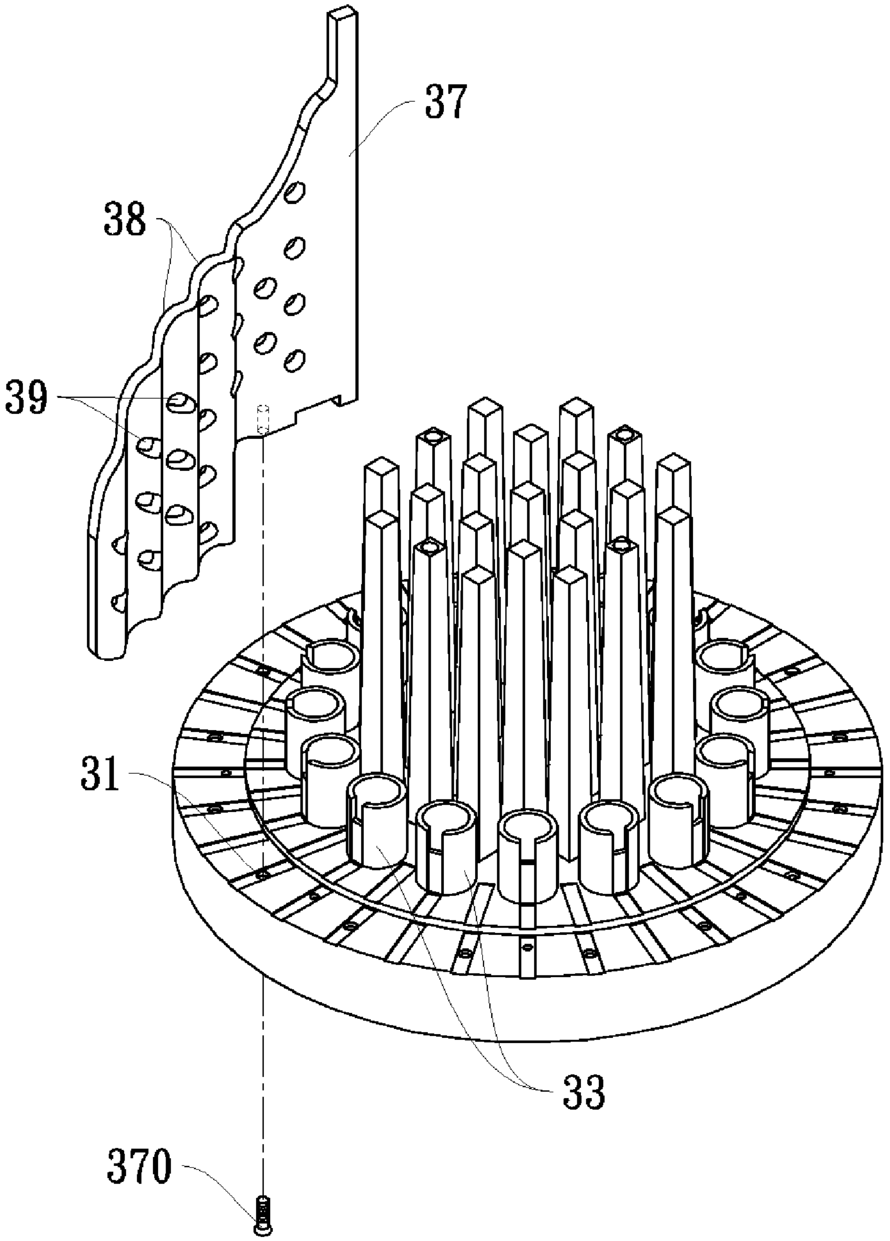
FIG. 7 is a perspective view of the main part of heat sink to be assembled with a third heat radiating plate.
Figure 8:
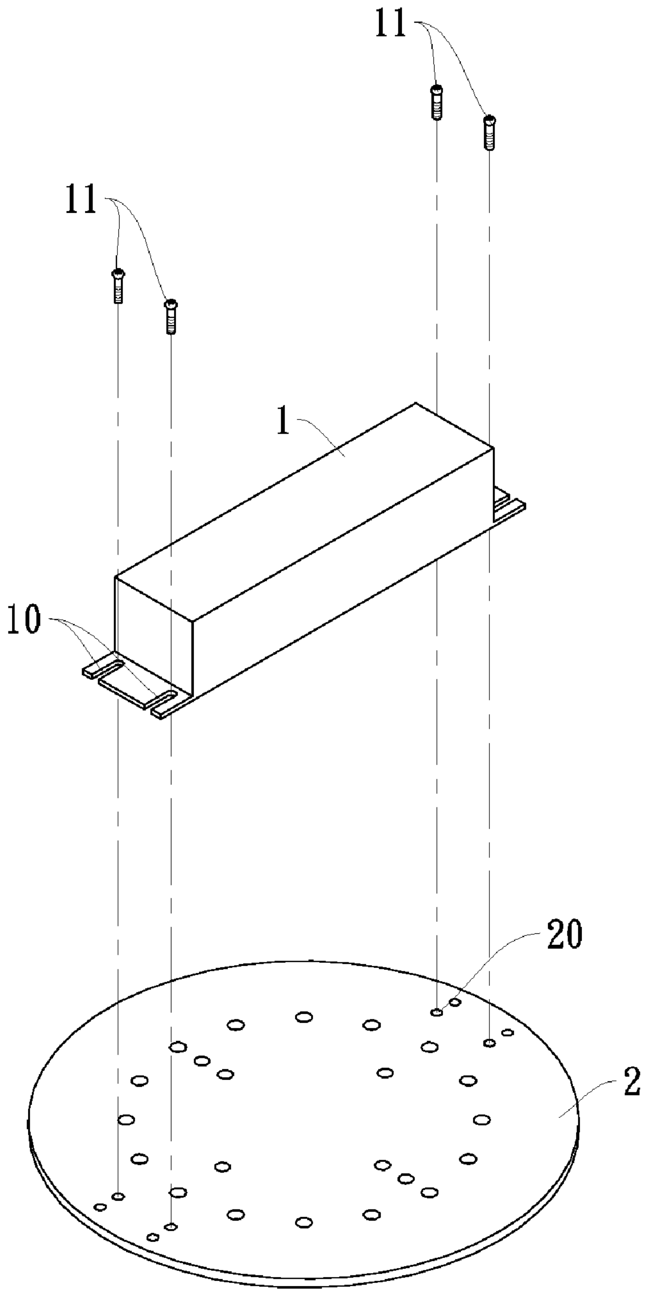
FIG. 8 is a perspective view of the rectifier to be assembled with the mounting plate.
Figure 9:
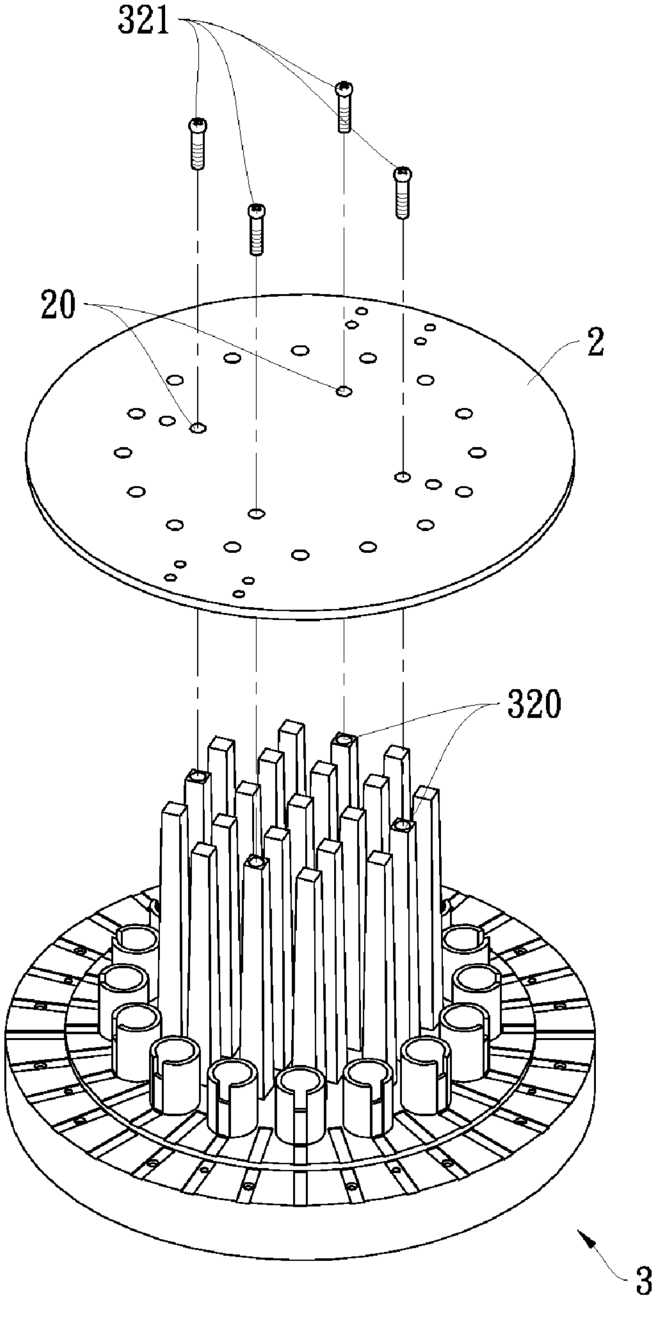
FIG. 9 is a perspective view of the mounting plate to be assembled with the main part of the heat sink.
Figure 10:
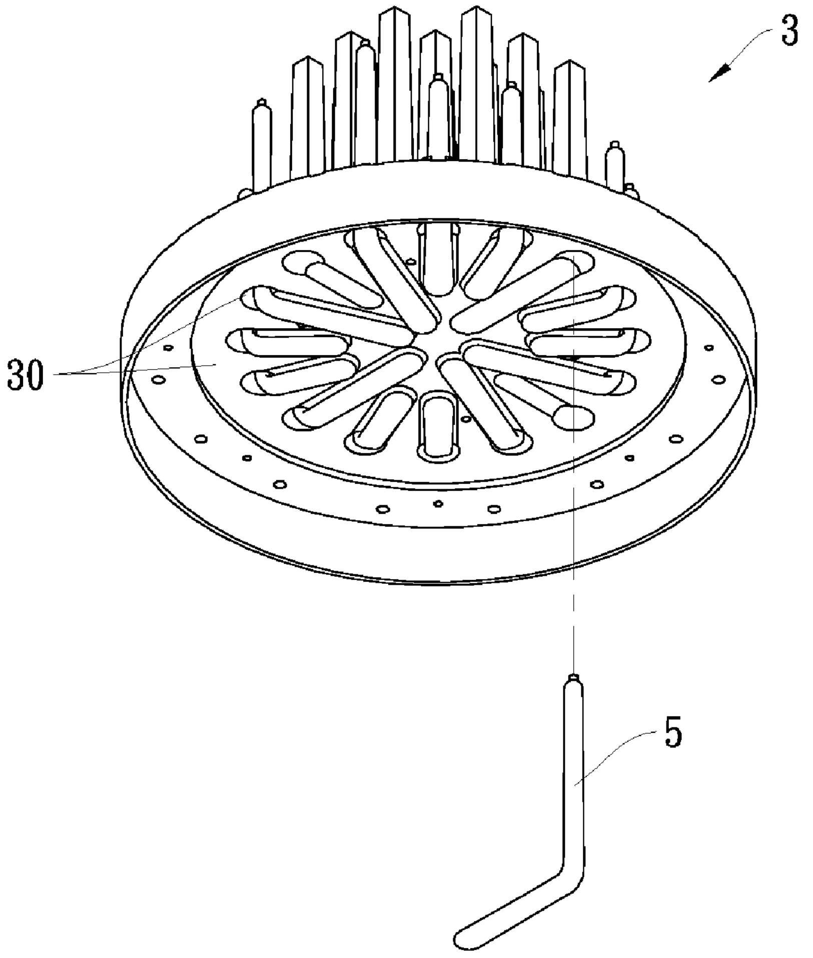
FIG. 10 is a perspective view of the heat conduction member to be assembled with the main part of the heat sink.
Figure 11:
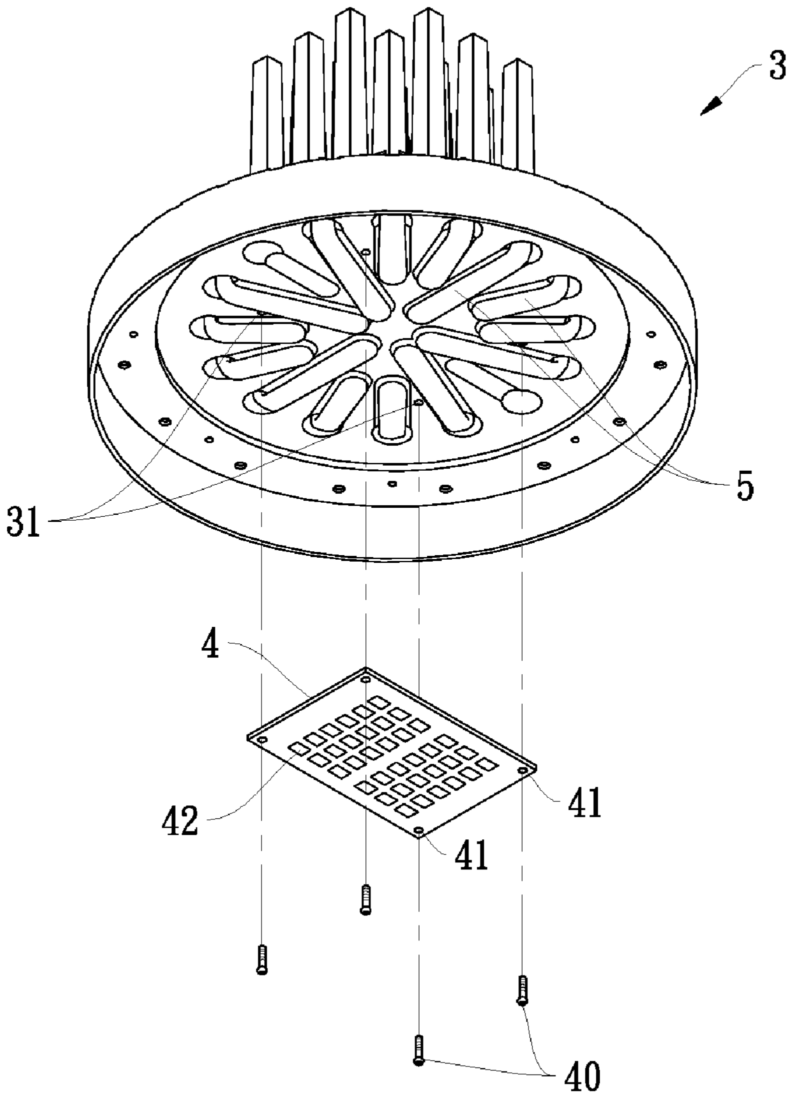
FIG. 11 is a perspective view of the circuit board to be assembled with the main part of the heat sink.

A plurality of first heat radiating plates 35 each has one end tightly put on the longitudinal part of the heat conduction member 5 (see FIG. 5), a plurality of second heat radiating plates 36 each has one end tightly inserted into the heat radiating element 33 (see FIG. 6), and a plurality of third heat radiating plates 37 each has a threaded hole (not numbered) so that a plurality of fasteners (e.g., screws) 370 each can be driven through the threaded hole 31 into the threaded hole of the third heat radiating plate 37 to fasten the third heat radiating plates 37 and the heat sink 3 together (see FIG. 7). The first, second, and third heat radiating plates 35, 36 and 37 are arranged in a circle. Each of the first, second, and third heat radiating plates 35, 36, and 37 is made of aluminum. Therefore, the first, second, and third heat radiating plates 35, 36, and 37 are in good thermal contact with the main part of the heat sink 3 in order to conduct heat generated by the LEDs 42 away when the LED lamp is turned on as detailed later. Each of the first, second, and third heat radiating plates 35, 36, and 37 has a plurality of openings 39 and wavy top and bottom edges 38 all for facilitating heat dissipation.

Operation of the invention will be described in detail below. First, electrically connect the rectifier 1 to an external AC power source (e.g., wall outlet) and turn on a switch (not shown) to power the rectifier 1. The LEDs 42 are activated by DC power supplied from the rectifier 1 to illuminate. Portion of heat generated by the LEDs 42 is transferred to the heat conduction members 5 by conduction. The heat is further transferred to the first heat radiating plates 35. Another portion of heat generated by the LEDs 42 is transferred to the second and third heat radiating plates 36, 37 by conduction via the disc portion of the heat sink 3 and the heat radiating elements 33. Moreover, the channels 34 can cause air to carry the generated heat away from the heat radiating members 32 via convection. Further, the openings 39 and the wavy edges 38 can facilitate heat dissipation via convection. Preferably, LEDs 42 are 300 W. Also, illumination of the LEDs 42 is increased greatly. Further, the useful life of the LED lamp is increased significantly. All of the above benefits are obtained by the improved heat sink.

Figure 12:
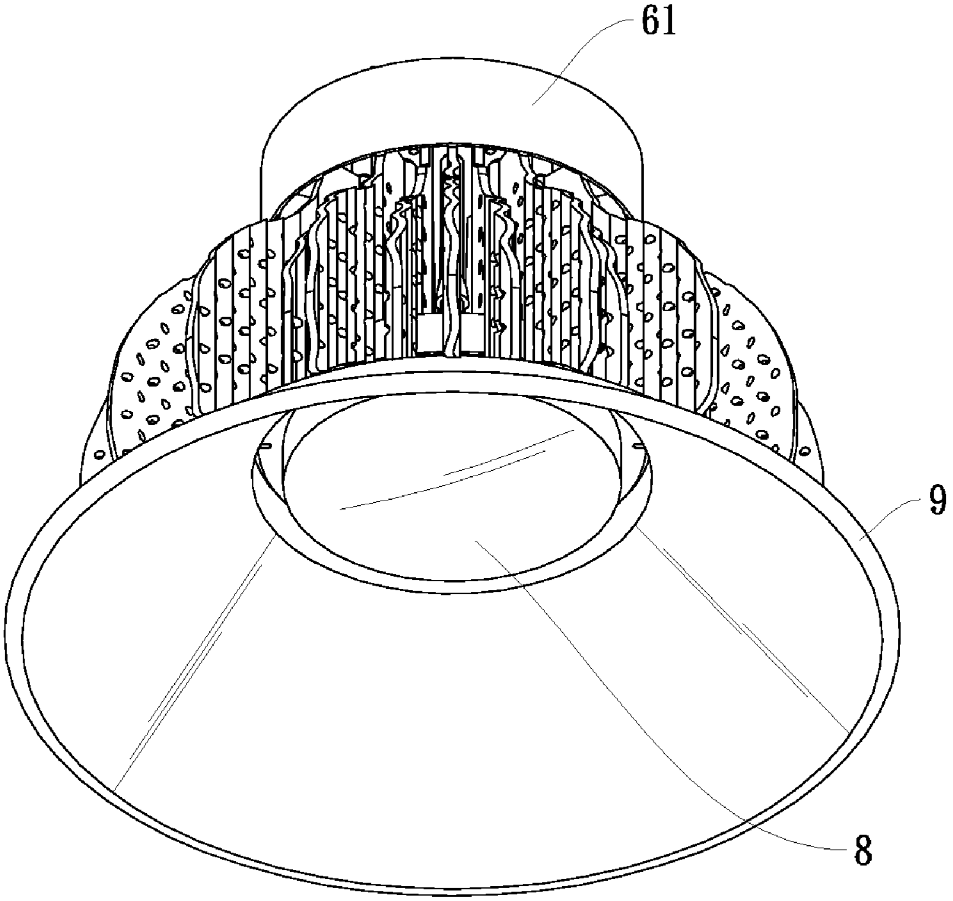
FIG. 12 is a perspective view of an LED lamp according to a second preferred embodiment of the invention.
Figure 13:
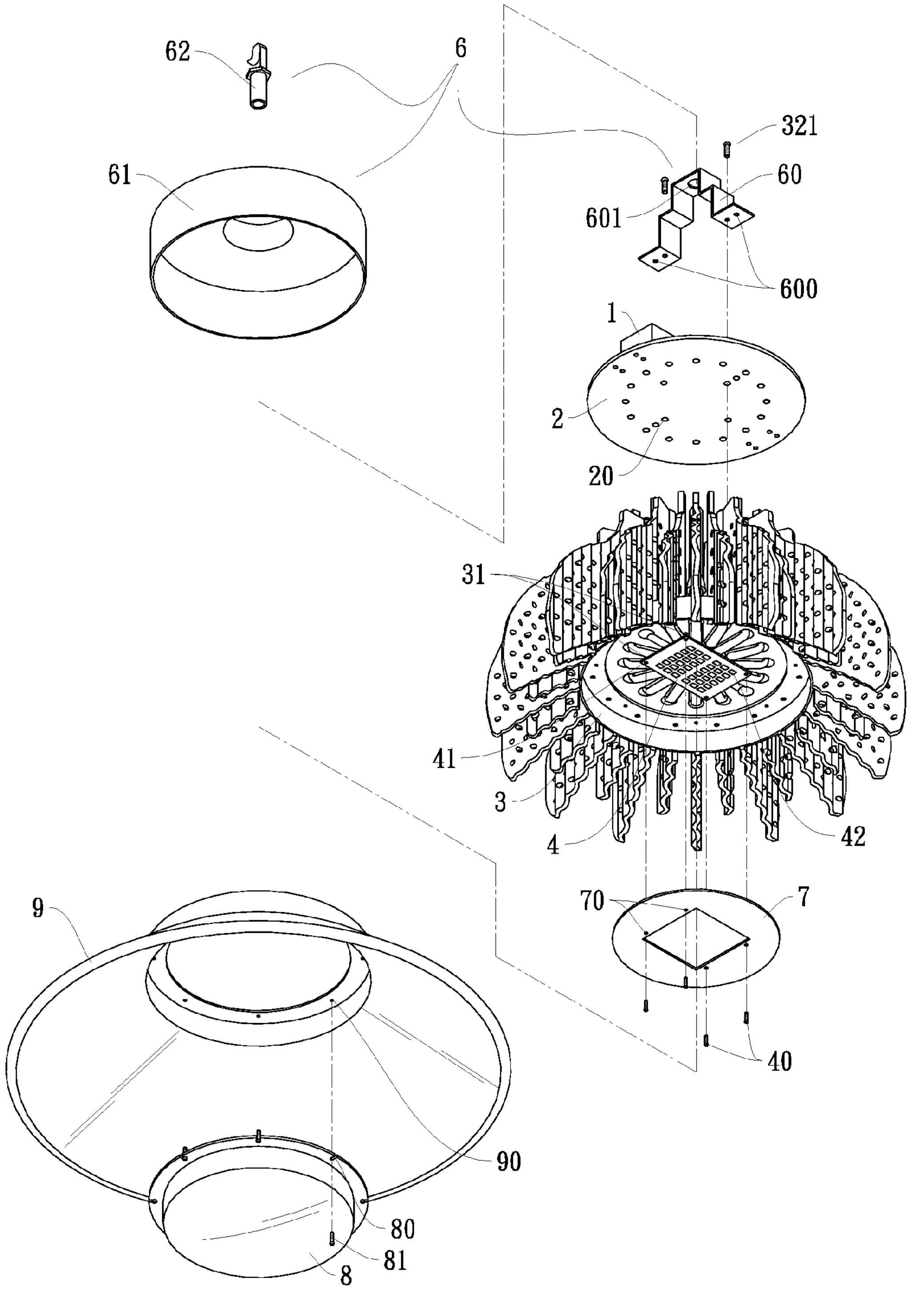
FIG. 13 is an exploded view of the LED lamp of FIG. 12.

Referring to FIGS. 12 and 13 in conjunction with FIGS. 1 to 11, an LED lamp in accordance with a second preferred embodiment of the invention is shown. The characteristics of the second preferred embodiment are substantially the same as that of the first preferred embodiment except the following:

A mounting assembly 6 comprises an annular shroud 61 having an open bottom and an opening on a top, and a fastening member 60 including a plurality of threaded holes 600 on either end, the fastening member 60 being shaped complimentarily to the rectifier 1 so that a plurality of fasteners (e.g., screws) 321 may be driven through the threaded holes 600, 20 into the main part of the heat sink 3 to secure the fastening member 60, the rectifier 1, and the heat sink 3 together.

The mounting assembly 6 further comprises a hook 62 adapted to have its longitudinal part inserted through the top opening of the shroud 61 into a central threaded hole 601 so that the shroud 61 and the fastening member 60 can be fastened together.

An annular plate member 7 comprises a central square opening (not numbered) and four through holes 40 at four corners of the square opening respectively. A plurality of fasteners (e.g., screws) 40 may be driven through the through holes 70 into the threaded holes 41 to secure the plate member 7 and the circuit board 4 together in which the square opening right below the LEDs 42. A flared shade 9 made of aluminum and comprises a plurality of threaded holes 90 on a top annular flange. A transparent globe 8 comprises a plurality of through holes 80 on an annular flange on a top edge so that a plurality of fasteners (e.g., screws) 81 may be driven through the through holes 80 and the threaded holes 90 into the threaded holes 31 to secure the globe 8, the shade 9, and the heat sink 3 together in which the globe 8 is right below the plate member 7 so that light emitted by the LEDs 40 can pass through the globe 8 to illuminate downward. Moreover, the aluminum shade 9 secured to the heat sink 3 may facilitate the heat dissipation by conduction.

While the invention has been described in terms of preferred embodiments, those skilled in the art will recognize that the invention can be practiced with modifications within the spirit and scope of the appended claims.

What is claimed is:

1. An LED (light-emitting diode) lamp comprising:

a rectifier (1) for converting AC (alternating current) into DC (direct current);

an inverted cup shaped heat sink (3) comprising a plurality of spaced, elongated heat radiating members (32) projecting upward from top, and a plurality of spaced hollow cylindrical heat radiating elements (33) arranged around the heat radiating members (32);

a mounting plate (2) fastened between the rectifier (1) and the heat radiating members (32);

a plurality of L-shaped heat conduction members (5) each having a longitudinal part inserted through the heat radiating element (32) and a lateral part engaged with bottom of the heat sink (3), the number of the heat conduction members (5) being less than that of the heat radiating elements (33); and a circuit board (4) secured to the bottom of the heat sink (3) to fasten the lateral parts of the heat conduction members (5), the circuit board (4) comprising a plurality of LEDs (42) each electrically connected to the rectifier (1) and being in contact with the lateral parts of the heat conduction members (5), wherein the heat sink (3) further comprises a plurality of first heat radiating plates (35) each having one end put on the longitudinal part of the heat conduction member (5), a plurality of second heat radiating plates (36) each having one end fastened in the heat radiating element (33), and a plurality of third heat radiating plates (37) releasably secured to the heat sink (3);

wherein the first, second, and third heat radiating plates (35, 36, 37) are arranged around the heat radiating element (32); and wherein each of the first, second, and third heat radiating plates (35, 36, 37) comprises a plurality of openings (39) and shaped top and bottom edges (38).

2. The LED lamp of claim 1, wherein the first heat radiating plates (35) are formed of aluminum.

3. The LED lamp of claim 1, wherein the second heat radiating plates (36) are formed of aluminum.

4. The LED lamp of claim 1, wherein the third heat radiating plates (37) are formed of aluminum.

5. The LED lamp of claim 1, further comprising a mounting assembly (6) for securing to the mounting plate (2).

6. The LED lamp of claim 5, wherein the mounting assembly (6) comprises a fastening member (60), an annular shroud (61), and a hook (62).

7. The LED lamp of claim 1, further comprising an annular plate member (7) mounted onto bottom of the circuit board (4), and a globe (8) mounted below the plate member (7) and under the LEDs (42).

8. The LED lamp of claim 1, wherein the top and bottom edges (38) are wavy.

9. The LED lamp of claim 1, further comprising a shade (9) mounted under the heat sink (3).

10. The LED lamp of claim 9, wherein the shade (9) is formed of aluminum.

* * * * *